United States Patent
Di Taranto et al.

(10) Patent No.: US 11,018,808 B2
(45) Date of Patent: May 25, 2021

(54) RECEPTION FAILURE INDICATION BY LEGACY MESSAGE

(71) Applicant: Telefonaktiebolaget LM Ericsson (publ), Stockholm (SE)

(72) Inventors: Rocco Di Taranto, Lund (SE); Naveed Butt, Lund (SE); Thomas Nilsson, Malmö (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 472 days.

(21) Appl. No.: 15/760,262

(22) PCT Filed: Feb. 26, 2018

(86) PCT No.: PCT/EP2018/054667
§ 371 (c)(1),
(2) Date: Mar. 15, 2018

(87) PCT Pub. No.: WO2019/161930
PCT Pub. Date: Aug. 29, 2019

(65) Prior Publication Data
US 2020/0235862 A1    Jul. 23, 2020

(51) Int. Cl.
| | |
|---|---|
| *H04L 1/16* | (2006.01) |
| *H04L 1/18* | (2006.01) |
| *H04W 72/04* | (2009.01) |
| *H04W 74/08* | (2009.01) |

(52) U.S. Cl.
CPC .......... *H04L 1/1657* (2013.01); *H04L 1/1861* (2013.01); *H04W 72/0453* (2013.01); *H04W 74/0816* (2013.01)

(58) Field of Classification Search
CPC . H04W 74/08; H04W 74/006; H04W 72/042; H04W 72/1289; H04W 74/0833;
(Continued)

(56) References Cited

U.S. PATENT DOCUMENTS

| | | |
|---|---|---|
| 2005/0270978 A1 | 12/2005 | Haines |
| 2008/0045272 A1 | 2/2008 | Wang et al. |

(Continued)

FOREIGN PATENT DOCUMENTS

| | | |
|---|---|---|
| RU | 2420929 C2 | 6/2011 |
| WO | WO 2011/013986 A2 | 2/2011 |

(Continued)

OTHER PUBLICATIONS

International Search Report and Written Opinion of the International Searching Authority, PCT/EP2018/054667, dated Nov. 20, 2018, 13 pages.

(Continued)

*Primary Examiner* — Dady Chery
(74) *Attorney, Agent, or Firm* — Sage Patent Group

(57) ABSTRACT

A first radio device receives a first radio transmission from a second radio device. In response to reception of the first radio transmission by the first radio device being unsuccessful, the first radio device sends a second radio transmission to the second radio device. The second radio transmission comprises an indication to the second radio device that reception of the first radio transmission by the first radio device was unsuccessful. The first radio device generates the second radio transmission to be decodable by one or more other radio devices than the second radio device as comprising a positive acknowledgement message, indicating to the second radio device that reception of the first radio transmission by the first radio device was successful, as comprising a clear-to-send message to the second radio device, or as some other legacy message supported by the other radio device(s).

22 Claims, 7 Drawing Sheets

(58) Field of Classification Search
CPC .......... H04W 72/0453; H04W 74/0816; H04L 1/1657; H04L 1/1861
See application file for complete search history.

(56) References Cited

U.S. PATENT DOCUMENTS

2010/0296388 A1* 11/2010 Shimizu ................ H04L 1/1825
370/216
2013/0279465 A1* 10/2013 Timner ............... H04W 74/006
370/329

FOREIGN PATENT DOCUMENTS

WO    WO 2012/087199 A1    6/2012
WO    WO 2015/191356 A1    12/2015

OTHER PUBLICATIONS

D. Xia et al., "Evaluation of the Minstrel Rate Adaptation Algorithm in IEEE 802.11g WLANs," IEEE ICC 2013—Communication QoS, Reliability and Modeling Symposium, 6 pages, 2013.
N. Butt et al., "On the Feasibility to Overlay a Narrowband IoT Signal in IEEE 802.11", in Proc. IEEE PIMRC 2017, 6 pages, 2017.
E. Perahia, R. Spacey, "Next Generation Wireless LANs", Chapter 15—Fast link adaptation, Cambridge University Press, pp. 440-444, 2013.
Decision to Grant a Patent for Invention dated Jan. 26, 2021 for Russian Patent Application No. 2020131520/07 (057275), 26 pages.
Search Report dated Jan. 14, 2021 for Russian Patent Application No. 2020131520/07 (057275), 4 pages.

\* cited by examiner

RECEPTION FAILURE INDICATION BY LEGACY MESSAGE

CROSS REFERENCE TO RELATED APPLICATION

This application is a 35 U.S.C. § 371 national stage application of PCT International Application No. PCT/EP2018/054667, filed on Feb. 26, 2018, the disclosure and content of which is incorporated by reference herein in its entirety.

TECHNICAL FIELD

The present invention relates to methods for controlling radio transmissions and to corresponding radio devices, systems, and computer programs.

BACKGROUND

In wireless communication systems it is known to provide a feedback mechanism to inform a transmitting station whether a radio transmission from the transmitting station was successfully received by a receiving station. At the transmitting, feedback information provided from the receiving station to the transmitting station may for example be used for adaptation of a modulation and coding scheme and/or transmit power, which is also referred to as link adaptation and power control. Further, the feedback information may also be used for triggering a retransmission.

For example, for the LTE (Long Term Evolution) technology specified by 3GPP ($3^{rd}$ Generation Partnership Project) HARQ (Hybrid Automatic Repeat Request) operation is defined in 3GPP TS 36.321 V15.0.0 (2018 January). In this case, the receiving station sends a positive acknowledgement (ACK) to the transmitting station if data was successfully decoded from the received radio transmission, and otherwise sends a negative acknowledgement (NACK) to the transmitting station.

In other feedback mechanisms, the transmitting station interprets absence of a positive acknowledgement after sending a radio transmission to the receiving station as an indication that the radio transmission was not successfully received by the receiving station. This may also be regarded as an implicit NACK. For example, in the case of a WLAN (Wireless Local Area Network) technology as specified in the IEEE 802.11 standards family, e.g., IEEE 802.11n or latest IEEE 802.11ac and currently developed IEEE 8201.11ax, the receiving station sends an ACK frame if a data frame from the transmitting station was received without error. If within a certain time period after sending a data frame the transmitting station does not receive an ACK frame for this data frame, the transmitting station assumes a failure of the transmission of the data frame. In response to such failure, the transmitting station may retransmit the data frame and/or perform link adaptation and/or power control. The detailed link adaptation is not specified in the IEEE 802.11 standards. A typical implementation of a link adaptation mechanism used in connection with the IEEE 802.11 standards is based on the Minstrel algorithm as for example described in D. Xia, J. Hart, Q. Fu, "Evaluation of the Minstrel Rate Adaptation Algorithm in IEEE 802.11g WLANs," in Proc. IEEE International Conference on Communications (ICC 2013), Budapest, Hungary, Jun. 9-13, 2013. The current IEEE 802.11 standards do not support a NACK message which explicitly indicates failure of a radio transmission.

The use of an implicit NACK like in the current IEEE 802.11 standards has the advantage that it is very simple and minimizes the amount of protocol overhead. On the other hand, using a feedback mechanism which also provides explicit NACKs may allow for providing valuable additional input to a link adaptation mechanism and improved efficiency of controlling retransmissions. However, introducing explicit NACKs in an existing wireless communication system may adversely affect legacy devices which cannot handle the explicit NACKs. For example, due to the contention-based access control scheme underlying the IEEE 802.11 standards, such explicit NACKs could block the legacy devices from radio channel access.

In US 2005/0270978 A1 it is proposed to extend an IEEE 802.11 technology by an ACK frame which carries additional information for selection of a modulation scheme for a future transmission from the transmitting station to the receiving station, while at the same time avoiding adversely impacting legacy devices. This is achieved by including the additional information in reserved bits or padding bits of a standard-compliant ACK frame transmitted in response to successfully receiving a data frame. Accordingly, the legacy devices will handle the ACK frames with the additional information in the same way as conventional ACK frames and will not unnecessarily refrain from attempting to gain radio channel access. However, in the feedback mechanism of US 2005/0270978 A1 the additional information can only be sent in response to successful reception of a data frame by the receiving station. Accordingly, performance of link adaption may still be unsatisfactory in situations where reception of data frames fails.

Accordingly, there is a need for techniques which allow for efficiently providing feedback for failed radio transmissions without adversely affecting legacy devices.

SUMMARY

According to an embodiment, a method of controlling radio transmissions in a wireless communication network is provided. According to the method, a first radio device receives a first radio transmission from a second radio device. In response to reception of the first radio transmission by the first radio device being unsuccessful, the first radio device sends a second radio transmission to the second radio device. The second radio transmission comprises an indication to the second radio device that reception of the first radio transmission by the first radio device was unsuccessful. The first radio device generates the second radio transmission to be decodable by one or more other radio devices than the second radio device as comprising a positive acknowledgement message, indicating to the second radio device that reception of the first radio transmission by the first radio device was successful, or as comprising a clear-to-send message to the second radio device.

According to a further embodiment, a method of controlling radio transmissions in a wireless communication network is provided. According to the method, a first radio device sends a first radio transmission to a second radio device. Further, the first radio device receives a second radio transmission from the second radio device. The second radio transmission comprises an indication to the first radio device that reception of the first radio transmission by the second radio device was unsuccessful. The second radio transmission is decodable by one or more other radio devices than the first radio device as comprising a positive acknowledgement message, indicating to the first radio device that reception of the first radio transmission by the second radio device was successful, or as comprising a clear-to-send message to the first radio device.

According to a further embodiment, a radio device for a wireless communication network is provided. The radio device is configured to receive a first radio transmission from a further radio device. Further, the radio device is configured to, in response to reception of the first radio transmission by the radio device being unsuccessful, send a second radio transmission to the further radio device. The second radio transmission comprises an indication to the further radio device that reception of the first radio transmission by the radio device was unsuccessful. Further, the radio device is configured to generate the second radio transmission to be decodable by one or more other radio devices than the further radio device as comprising a positive acknowledgement message, indicating to the further radio device that reception of the first radio transmission by the radio device was successful, or as comprising a clear-to-send message to the second radio device.

According to a further embodiment, a radio device for a wireless communication network is provided. The radio device is configured to send a first radio transmission to a further radio device. Further, the radio device is configured to receive a second radio transmission from the further radio device. The second radio transmission comprises an indication to the radio device that reception of the first radio transmission by the further radio device was unsuccessful. The second radio transmission is decodable by one or more other radio devices than the radio device as comprising a positive acknowledgement message, indicating to the radio device that reception of the first radio transmission by the further radio device was successful, or as comprising a clear-to-send message to the first radio device.

According to a further embodiment, a radio device for a wireless communication network is provided. The radio device comprises at least one processor and a memory containing instructions executable by said at least one processor, whereby the radio device is operative to receive a first radio transmission from a further radio device and, in response to reception of the first radio transmission by the radio device being unsuccessful, send a second radio transmission to the further radio device. The second radio transmission comprises an indication to the further radio device that reception of the first radio transmission by the radio device was unsuccessful. Further, the radio device is configured to generate the second radio transmission to be decodable by one or more other radio devices than the further radio device as comprising a positive acknowledgement message, indicating to the further radio device that reception of the first radio transmission by the radio device was successful, or as comprising a clear-to-send message to the second radio device.

According to a further embodiment, a radio device for a wireless communication network is provided. The radio device comprises at least one processor and a memory containing instructions executable by said at least one processor, whereby the radio device is operative to send a first radio transmission to a further radio device and to receive a second radio transmission from the further radio device. The second radio transmission comprises an indication to the radio device that reception of the first radio transmission by the further radio device was unsuccessful. The second radio transmission is decodable by one or more other radio devices than the radio device as comprising a positive acknowledgement message, indicating to the radio device that reception of the first radio transmission by the further radio device was successful, or as comprising a clear-to-send message to the first radio device.

According to a further embodiment, a system is provided. The system comprises a first radio device, a second radio device, and one or more other radio devices. The first radio device is configured to send a first radio transmission to the second radio device. The second radio device is configured to receive the first radio transmission and, in response to reception of the first radio transmission by the second radio device being unsuccessful, send a second radio transmission to the first radio device. The second radio transmission comprises an indication to the first radio device that reception of the first radio transmission by the second radio device was unsuccessful. Further, the second radio device is configured to generate the second radio transmission to be decodable by the one or more other radio devices as comprising a positive acknowledgement message, indicating to the first radio device that reception of the first radio transmission by the second radio device was successful, or as comprising a clear-to-send message to the first radio device.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to receive a first radio transmission from a further radio device. Further, execution of the program code causes the radio device to, in response to reception of the first radio transmission by the radio device being unsuccessful, send a second radio transmission to the further radio device. The second radio transmission comprises an indication to the further radio device that reception of the first radio transmission by the radio device was unsuccessful. Further, execution of the program code causes the radio device to generate the second radio transmission to be decodable by one or more other radio devices than the further radio device as comprising a positive acknowledgement message, indicating to the further radio device that reception of the first radio transmission by the radio device was successful, or as comprising a clear-to-send message to the second radio device.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to send a first radio transmission to a further radio device. Further, execution of the program code causes the radio device to receive a second radio transmission from the further radio device. The second radio transmission comprises an indication to the radio device that reception of the first radio transmission by the further radio device was unsuccessful. The second radio transmission is decodable by one or more other radio devices than the radio device as comprising a positive acknowledgement message, indicating to the radio device that reception of the first radio transmission by the further radio device was successful, or as comprising a clear-to-send message to the first radio device.

Details of such embodiments and further embodiments will be apparent from the following detailed description of embodiments.

DETAILED DESCRIPTION OF EMBODIMENTS

Figure 1:
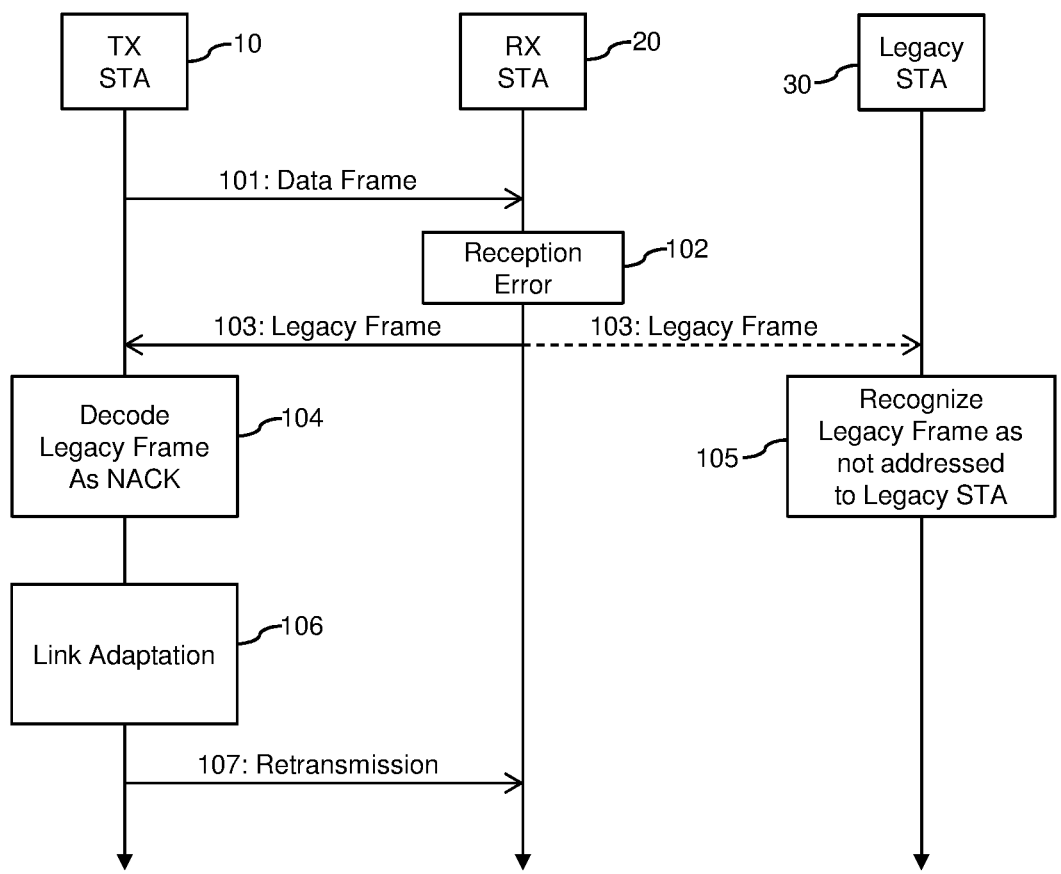
FIG. 1 illustrates an example of processes in a wireless communication network according to an embodiment of the invention.

In the following, concepts in accordance with exemplary embodiments of the invention will be explained in more detail and with reference to the accompanying drawings. The illustrated embodiments relate to controlling radio transmissions in a wireless communication network, in particular to providing feedback information from a receiving station to a transmitting station. In the illustrated examples, it is assumed that the wireless communication network is based on a WLAN technology, e.g., according to an IEEE 802.11 standards family, such as the recent IEEE 802.11ac-2013 or currently developed IEEE802.11ax standard. However, it is noted that other radio technologies could be used as well, e.g., a contention based mode of a cellular radio technology, like the LAA (Licensed Assisted Access) or MuLTEfire extensions of the LTE technology. Accordingly, in the illustrated example the wireless communication network uses contention based access to a radio channel, which involves that a radio device confirms that the radio channel is unoccupied before it proceeds to transmit on the radio channel. On the other hand, detecting that the radio channel is occupied may cause the radio device to back off and refrain from attempting to gain access to the radio channel before expiry of a back off time period.

In the illustrated examples, it is assumed that some radio devices in the wireless communication network support providing an explicit failure indication to a transmitting radio device if reception of a radio transmission by the intended receiving radio device was unsuccessful, e.g., in the form of a negative acknowledgment message (NACK message). These radio devices are in the following also referred to as new generation (NG) radio devices. The NG radio devices coexist with other radio devices, in the following referred to as legacy devices, which do not support the sending or reception of the failure indication.

In order to avoid adversely impacting operation of these legacy devices, the explicit failure indication is included in a legacy message also supported by the legacy devices. That is to say, the explicit failure indication, which is supported only by the NG radio devices, is conveyed in a legacy message also supported by the legacy radio devices. The examples as further illustrated in the following assume that the legacy message is a positive acknowledgement message (ACK) to the transmitting radio device, indicating successful reception of a radio transmission from the transmitting radio device, in particular an ACK frame or Block ACK frame. However, it is noted that other types of legacy messages could be used as well, e.g., a CTS (clear to send) frame addressed to the transmitting radio device, a data frame addressed to the transmitting radio device, e.g., a second or subsequent MPDU (Medium Access Control Protocol Data Unit) of a burst or fragment, a response to a poll from a PCF (Point Coordination Function), or a frame sent during a contention free period of a PCF. In each case, a legacy device will be able to decode the legacy message and recognize that the legacy message is not addressed to the legacy device. Accordingly, the legacy device will discard or otherwise ignore the legacy message, and operation of the legacy device is not adversely affected by the legacy message. In particular, since the above-mentioned types of legacy message do not cause other radio devices overhearing the legacy message to back off from attempting to gain access to the radio channel, the legacy message used to convey the failure indication will not cause the legacy device to back off from the radio channel.

On the other hand, the transmitting radio device receiving the legacy message is capable of detecting that the legacy message includes the failure indication and decodes the failure indication and optionally also further information from the legacy message. Accordingly, handling of the legacy message by the transmitting radio device deviates from conventional handling of the legacy message. For example, if the legacy message is conveying a failure indication, the transmitting radio device will detect the failure indication and rather interpret the legacy message as indicating that reception of a radio transmission from the transmitting radio device to the receiving radio device was unsuccessful.

FIG. 1 illustrates an example of processes which are based on the above concepts. The processes involve two NG radio devices, in particular a transmitting station (TX STA) 10 and a receiving station (RX STA) 20, and a legacy radio device (Legacy STA) 30. Here, it is noted that the radio devices may correspond to various types of radio devices, e.g., mobile or stationary wireless clients or access points.

In the example of FIG. 1, the transmitting station 10 sends a radio transmission with a data frame 101 to the receiving station 20. The receiving station 20 receives the radio transmission, but does not succeed in decoding the data frame 101. Accordingly, the receiving station 20 detects a reception error, as indicated by block 102.

In response to detecting the reception error, the receiving station 20 sends a failure indication in the form of a NACK to the transmitting station 10. A legacy frame 103 is used for conveying the NACK. As illustrated, the legacy frame 103 is received by the transmitting station 10, but can also be overheard by the legacy station 30.

The transmitting station 10, which is an NG radio device, detects that the legacy frame 103 is modified to convey the NACK and decodes the legacy frame 103 as the NACK, as indicated by block 104. On the other hand, the legacy station 30 is capable of decoding the legacy frame 103 and recognizing that the legacy frame is not addressed to the legacy station 30, as indicated by block 105. Accordingly, the legacy station 30 will discard the legacy frame 30.

The transmitting station 10 may then use the NACK and optionally additional information conveyed together with the NACK in the legacy frame 103 to perform link adaptation, as indicated by block 106, and/or to trigger a retransmission 107 of the data frame 101. For example, in addition to the NACK, the legacy frame 103 could also convey additional information indicating a suggested MCS and/or a radio channel quality between the transmitting station 10 and the receiving station 20, e.g., in terms of CSI (channel state information) or a CQI (channel quality indicator). This additional information could then be used for performing link adaptation at block 106, e.g., by selecting a more robust MCS than used for the initial radio transmission with the data frame 101. Alternatively the additional information can be interpreted as NACK, so that the NACK does need not to be indicated separately.

In the following, it will be explained in more detail how the legacy frame 103 can be modified to convey the NACK to the transmitting station 10 while still ensuring that the legacy frame 103 remains decodable by the legacy station 30 and other legacy radio devices, by overlaying the legacy frame 103 with additional information. In particular, examples will be explained how a legacy ACK frame can be overlaid with additional information to indicate a NACK and optionally further information, like a suggested MCS or channel quality information. However, it is noted that similar overlay techniques could also be applied for other legacy frames, such as a CTS frame, a data frame, a response to a poll from a PCF, or a frame sent during a contention free period of a PCF.

In the following description, utilization of a WLAN technology using OFDM (orthogonal frequency division multiplexing) with a nominal radio channel of 20 MHz is assumed. Further, it is assumed that the radio transmissions are generated using a 64 point IFFT (Inverse Fast Fourier Transform), i.e., the number of sub-carriers is 64, the sub-carrier spacing is 20/64 MHz=312.5 kHz., and that the duration of one OFDMA symbol is 64/20 µs=3.2 µs, not including the cyclic prefix (CP). In accordance with the IEEE 802.11ac standard, eight sub-carriers are used as a guard band and four sub-carriers for transmission of pilot signals. Accordingly, 52 sub-carriers per OFDM symbol are available for conveying data.

Figure 2:
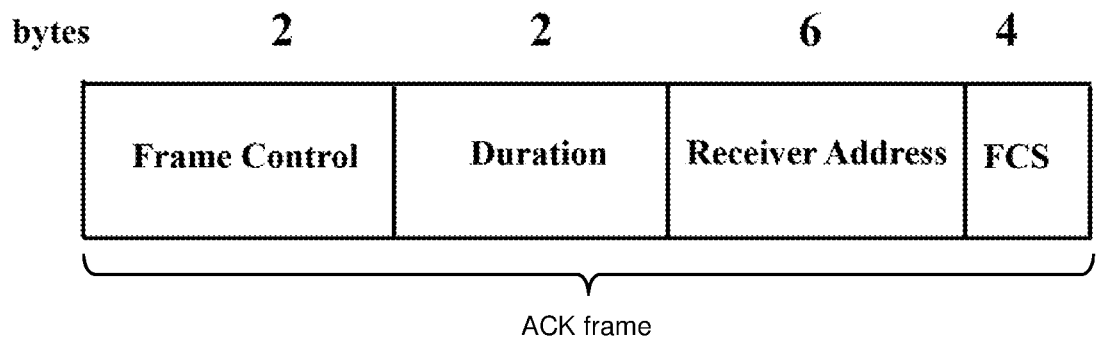
FIG. 2 illustrates an example of a message format of a legacy message as used according to an embodiment of the invention for conveying a NACK message.

FIG. 2 shows the structure of a conventional ACK frame of the IEEE 802.11ac standard. As can be seen, the conventional ACK frame is formed of four fields with a total of 14 bytes, corresponding to 112 bits to transmit. One of the fields includes a receiver address, which may be used to identify the radio device the conventional ACK frame is addressed to. A frame control field indicates the type of the frame, i.e., that the frame is an ACK frame. A duration field indicates the number of OFDM symbols of the frame. An FCS (Frame Check Sequence) field includes an error detection code, e.g., a CRC (cyclic redundancy check) code for confirming integrity of the frame.

The MCS used to transmit the conventional ACK frame depends on the MCS used for the data frame to acknowledge. As a result, also the number of OFDM symbols used for transmission of the ACK frame may vary depending on the MCS used for the data frame to acknowledge. For example, if the conventional ACK frame is sent using BPSK (binary phase shift keying) and a code rate of 0.5, five OFDM symbols are needed for transmission of the conventional ACK frame. If the conventional ACK frame is sent using QPSK (quadrature phase shift keying) and a code rate of 0.5, three OFDM symbols are needed for transmission of the conventional ACK frame. If the conventional ACK frame is sent using QPSK and a code rate of 0.75 or 16 QAM (16 constellation point quadrature amplitude modulation) and a code rate of 0.5, only two OFDM symbols are needed for transmission of the conventional ACK frame.

In each of the above-mentioned MCS schemes, not the entire capacity of the OFDM symbols is needed for the transmission of the conventional ACK frame. By way of example, if the conventional ACK frame is sent using BPSK and a code rate of 0.5, the five OFDM symbols needed for transmission of the conventional ACK frame provide a total payload capacity of 260 subcarriers (52 sub-carriers per OFDM symbol), of which 224 are needed for encoding the conventional ACK frame.

According to one variant, the capacity of the OFDM symbols which is not needed for conveying the conventional ACK frame is used to convey the indication of the NACK and optionally further information, such as a suggested MCS and/or channel quality information. For example, in the above-mentioned example of using BPSK and a code rate of 0.5, there is an extra payload capacity of 36 subcarriers which is not needed for transmission of the conventional ACK frame, which can be used for transmitting the indication of the NACK and optional further information. In this example, up to eighteen additional bits can be transmitted using the extra capacity. In the case of a conventional ACK frame, padding would be applied to extend the transmitted data to an integer number of OFDM symbols. When overlaying the conventional ACK frame with the indication of the NACK and optional further information, at least a part of the padding may be replaced by further payload data including the indication of the NACK and optional further information.

If more than the extra capacity of the OFDM symbols is needed for transmission of the conventional ACK frame and transmitting the indication of the NACK and optional further information, the conventional ACK frame can be extended by modifying the duration field.

Figure 3:
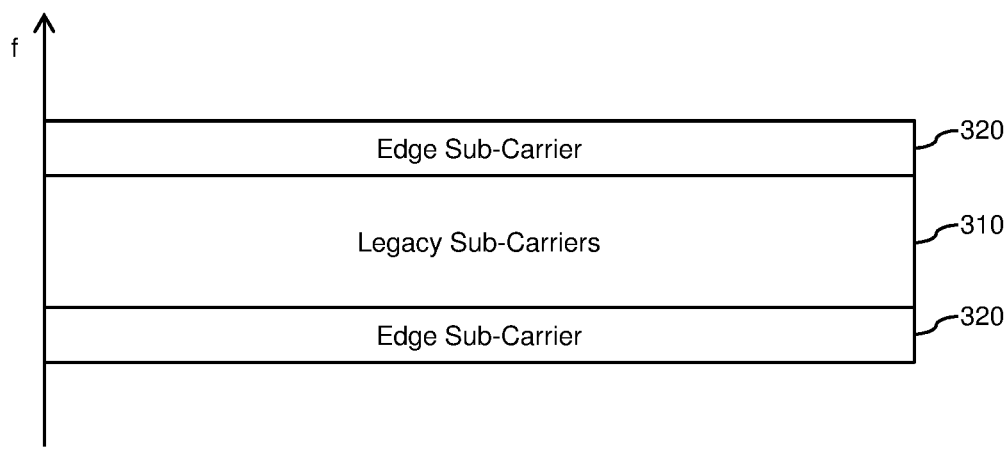
FIG. 3 schematically illustrates utilization of edge carriers for overlaying the legacy message with the NACK message in accordance with an embodiment of the invention.

FIG. 3 schematically illustrates a further variant, in which edge sub-carriers of the ACK frame are used to convey the indication of the NACK and optionally further information, such as a suggested MCS and/or channel quality information. In particular, FIG. 3 illustrates legacy sub-carriers 310, which are used by the legacy radio devices for transmission of the ACK frame, and edge sub-carriers 320 adjacent to the legacy sub-carriers 310. The legacy radio devices do not transmit on the edge sub-carriers 320 and also do not attempt to decode data from the edge sub-carriers. Accordingly, the edge sub-carriers can be used for overlaying the additional information onto the ACK frame. By way of example, the NG radio device could detect the presence of a signal on the edge sub-carriers 320 and, if no signal is present on the edge sub-carriers 320, interpret the ACK frame as a conventional ACK frame indicating successful reception of the radio transmission to be acknowledged. If however a signal is present on the edge sub-carriers 320, the NG radio device could interpret the ACK frame as indicating a NACK. Still further, since multiple OFDM symbols are used for transmission of the ACK frame, additional information like a suggested MCS or channel quality information can be encoded on the edge sub-carriers 320. By way of example, if the ACK frame is transmitted with BPSK modulation and a code rate of 0.5, five OFDM symbols are needed for transmission of the ACK frame, and the presence or absence of a signal on the edge sub-carriers 320 may be used to encode up to 5 bits of additional data or to use redundancy for improving robustness of the NACK indication or additional information.

Figure 4:
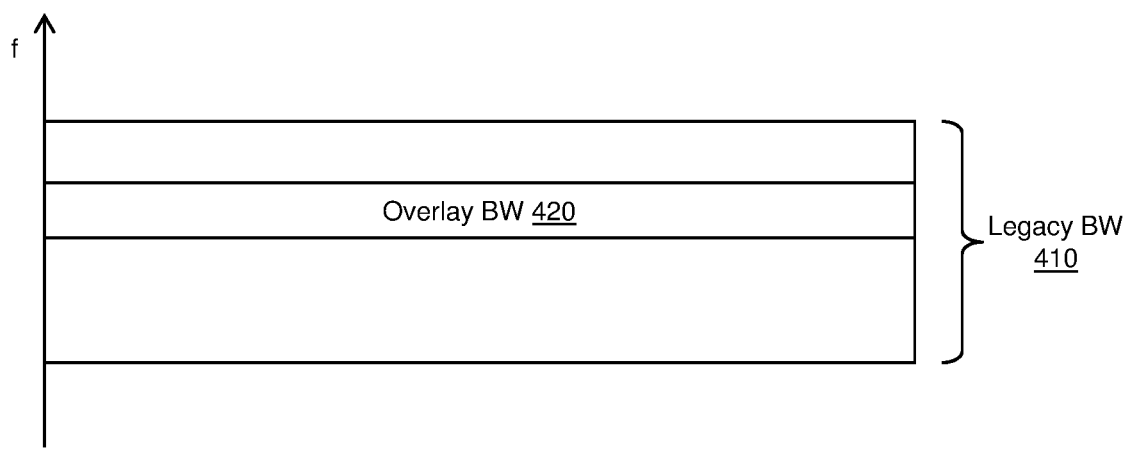
FIG. 4 schematically illustrates utilization of a subset of a legacy bandwidth for overlaying the legacy message with the NACK message in accordance with an embodiment of the invention.

FIG. 4 schematically illustrates a further variant, in which a specific part of a legacy bandwidth used for transmission of the ACK frame is allocated for overlaying the indication of the NACK and optionally further information, such as a suggested MCS and/or channel quality information. In particular, FIG. 4 illustrates the legacy bandwidth 410, e.g., the above-mentioned 20 MHz with 64 sub-carriers, and an overlay bandwidth 420 which corresponds to only a subpart of the legacy bandwidth 410 and is used for overlaying the indication of the NACK and optionally further information. From the perspective of a legacy radio device, the overlaying of data in the overlay bandwidth 420 is perceived as a disturbance. Nonetheless, encoding of the ACK frame may be sufficiently robust to allow decoding by the legacy device. The NG radio devices may in turn subject the overlay bandwidth to a specific decoding process, which allows for decoding the indication of the NACK and optionally transmitted further information. Accordingly, two OFDM symbols are transmitted on the same frequency and time resources in such a way that the respective intended receivers can still decode their respective signals. The feasibility of using such subpart of the bandwidth for overlaying additional information was demonstrated in "On the Feasibility to Overlay a NB-IoT Signal in IEEE 802.11", by N. Butt et al., IEEE International Symposium on Personal, Indoor and Mobile Radio Communications (PIMRC), Montreal, Canada, October 2017.

In the example of FIG. 4, the overlay bandwidth 420 forms a small contiguous part of about 10% of the legacy bandwidth 410. However, it is noted that depending on conditions and utilized transmission parameters, also a smaller or larger part of the legacy bandwidth 410 could be used for the overlay bandwidth 420. As a general rule, a more robust MCS allows for using a larger part of the legacy bandwidth 410 for the overlay bandwidth 420. Further, the overlay bandwidth 420 could also be spread over non-contiguous frequency resources. Still further, different power levels may be used for the transmission of the conventional ACK frame and for the transmission of the information in the overlay bandwidth 420.

Figure 5A:
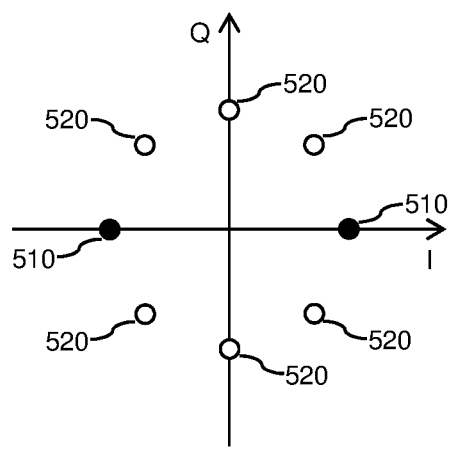
FIGS. 5A and 5B schematically illustrate overlaying the legacy message with the NACK message according to an embodiment of the invention by utilizing of a two-dimensional constellation diagram having a subset of constellation points defining a one-dimensional constellation diagram used for conveying the legacy message.
Figure 5B:
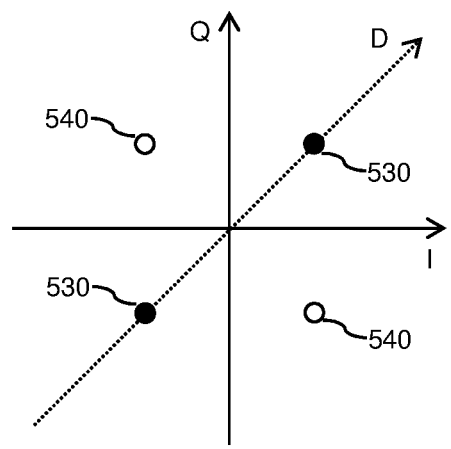

FIGS. 5A and 5B schematically illustrate a further variant, in which the ACK frame with the overlaid indication of the NACK and optionally further information, such as a suggested MCS and/or channel quality information, is transmitted using a modulation scheme with a two-dimensional constellation diagram, such as QPSK or QAM, and a subset of the constellation points of the two-dimensional constellation diagram forms a one-dimensional constellation diagram like used for transmission of the conventional ACK frame. In this case, the constellation points which are not part of the subset can be used for encoding the indication of the NACK and optional further information.

In the example of FIG. 5A, a two-dimensional constellation diagram based on π/4-QPSK is used, which has constellation points 510, 520 arranged in an I-Q (in phase-quadrature) space. As can be seen, the constellation points 510 are arranged on the I-axis and form a one-dimensional constellation diagram like in the case of BPSK. The other constellation points 520 are located off the I-axis and would not be considered by a legacy radio device performing BPSK demodulation. Accordingly, the constellation points 520 can be used by the NG radio devices to encode the indication of the NACK and optional further information.

In the example of FIG. 5B, a two-dimensional constellation diagram based on QPSK or 4-QAM is used, which has constellation points 530, 540 arranged in an I-Q space. As can be seen, the constellation points 530 are arranged on a D-axis, which is rotated by 45° with respect to the I axis and Q axis, and form a one-dimensional constellation diagram like in the case of BPSK. The other constellation points 540 are located off the D-axis and would not be considered by a legacy radio device performing BPSK demodulation along the D-axis.

Accordingly, the constellation points 540 can be used by the NG radio devices to encode the indication of the NACK and optional further information.

In the examples of FIGS. 5A and 5B, the presence of signal power on the other constellation points 520, 540, which are not considered in the BPSK demodulation, may appear as an additional disturbance for the legacy devices. To compensate this effect, transmit power may be distributed unevenly over, on the one hand, the constellation points 510, 530 of the one-dimensional subset and, on the other hand, the other constellation points 520, 540. In particular, less transmit power may be allocated to the other constellation points 520, 540 to minimize disturbances perceived by the legacy radio devices. To avoid that the lower transmit power results in insufficient reliability of the information encoded on the other constellation points 520, 540, this information may be transmitted in a repetitive or otherwise redundant manner over multiple OFDM symbols of the ACK frame.

Figure 6A:
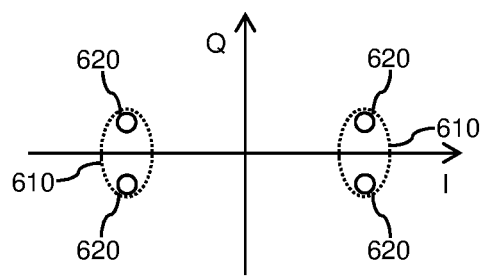
FIGS. 6A and 6B schematically illustrate overlaying the legacy message with the NACK message according to an embodiment of the invention by utilizing a hierarchical modulation scheme.
Figure 6B:
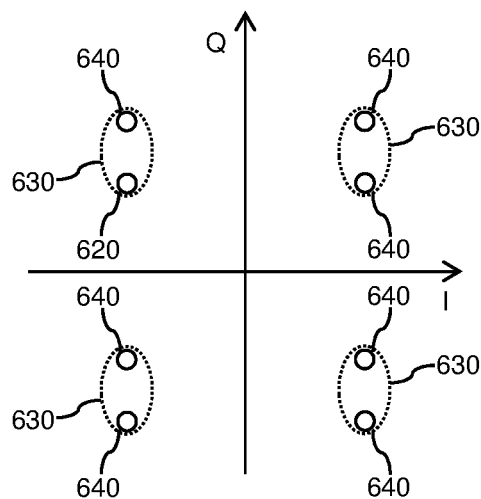

FIGS. 6A and 6B schematically illustrate a further variant, in which the ACK frame with the overlaid indication of the NACK and optionally further information, such as a suggested MCS and/or channel quality information, is transmitted using a hierarchical modulation scheme. In particular, the conventional ACK frame is encoded by a base layer of the hierarchical modulation scheme, and one or more higher layer of the hierarchical modulation scheme are used for encoding the indication of the NACK and optionally further information, such as a suggested MCS and/or channel quality information.

In the example of FIG. 6A, the base layer of the hierarchical modulation scheme corresponds to BPSK modulation along the I-axis, giving constellation points 610. A higher layer is provided by modulation along the Q-axis, resulting in splitting of the constellation points 610 into sub-constellations with constellation points 620. A legacy radio device performing BPSK demodulation along the I-axis would not resolve the differences between the constellation points 620 within the same sub-constellation, but merely the differences between the constellation points 610 of the base layer. Accordingly, the constellation points 620 of the sub-constellations can be used by the NG radio devices to encode the indication of the NACK and optional further information.

In the example of FIG. 6B, the base layer of the hierarchical modulation scheme corresponds to 4-QAM modulation, giving constellation points 630. A higher layer is provided by modulation along the Q-axis, resulting in splitting of the constellation points 630 into sub-constellations with constellation points 640. A legacy radio device performing 4-QAM demodulation would not resolve the differences between the constellation points 640 within the same sub-constellation, but merely the differences between the constellation points 630 of the base layer. Accordingly, the constellation points 640 of the sub-constellations can be used by the NG radio devices to encode the indication of the NACK and optional further information.

In the examples of FIGS. 6A and 6B, the presence of signal power on the higher layer of the hierarchical modulation scheme may appear as an additional disturbance for the legacy devices. To compensate this effect, transmit power may be distributed unevenly over the base layer and the higher layer. In particular, by lowering the transmit power allocated to the higher layer relative to the transmit power allocated to the base layer, the distances between the constellation points 620, 640 of the sub-constellations may be reduced as compared to the distances between the constellation points 610, 630 of the base layer. By way of example, if 10% of a total transmit power are allocated to the higher layer and 90% to the base layer, the result would be that a legacy radio device perceives a power reduction of about 0.5 dB and about 0.5 dB additional noise for the base layer, i.e., about 1 dB loss in terms of signal-to-noise ratio, which is tolerable in most cases. The signal-to-noise ratio for the higher layer is about 10 times lower than the for the base layer. This can be compensated by redundantly modulating the same data on ten subcarriers to achieve a processing gain of 10 dB.

It is noted that while the examples of FIGS. 6A and 6B consider a two-layer hierarchical modulation scheme, utilization of higher numbers of layer could be possible as well. For example, when using a three-layer hierarchical modulation scheme, a base layer of the hierarchical modulation scheme could be used for encoding the conventional ACK frame, a first higher layer could be used to encode the indication of the NACK, and a second higher layer could be used to encode further information, like a suggested MCS and/or channel quality information.

Figure 7:
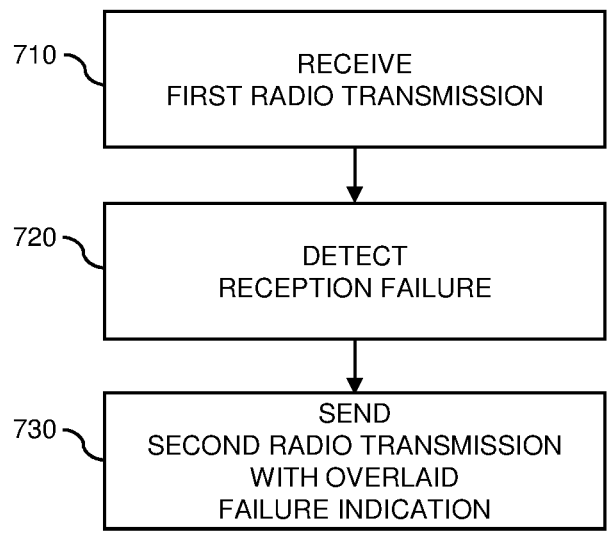
FIG. 7 shows a flowchart for schematically illustrating a receiver based method of controlling radio transmissions according to an embodiment of the invention.

FIG. 7 shows a flowchart for illustrating a method of controlling radio transmissions, which may be utilized for implementing the illustrated concepts. The method of FIG. 7 may be used for implementing the illustrated concepts in a first radio device which receives a radio transmission from a second radio device. For example, the first radio device could correspond to the above-mentioned receiving station 20, and the second radio device could correspond to the above-mentioned transmitting station 10. The radio transmissions may be based on a WLAN technology or on a contention-based mode of a cellular radio access technology.

If a processor-based implementation of the first radio device is used, at least some of the steps of the method of FIG. 7 may be performed and/or controlled by one or more processors of the first radio device. Such radio device may also include a memory storing program code for implementing at least some of the below described functionalities or steps of the method of FIG. 7.

At step 710, the first radio device receives a first radio transmission from the second radio device. The first radio transmission may for example be a data frame of a WLAN technology, such as explained for the above-mentioned data frame 101.

At step 720, the first radio device may detect a reception error, i.e., detect that reception of the first radio transmission by the first radio device was unsuccessful. This may for example involve performing an error check based on an error check code included in the first radio transmission.

At step 730, the first radio device sends a second radio transmission with an overlaid failure indication. That is to say, in response to reception of the first radio transmission by the first radio device being unsuccessful, the first radio device sends a second radio transmission to the second radio device, and the second radio transmission includes an indication to the second radio device that reception of the first radio transmission by the first radio device was unsuccessful. The first radio device generates the second radio transmission to be decodable by one or more other radio devices than the second radio device as including a positive acknowledgement (ACK) message indicating to the second radio device that reception of the first radio transmission by the first radio device was successful or as comprising a CTS message to the second radio device, i.e., a message sent in response to an RTS (ready to send) message from the first radio device and indicating that the first radio device is prepared to receive a radio transmission from the second radio device. The ACK message may be an ACK frame acknowledging a single radio transmission or a block ACK frame transmitted upon request to acknowledge multiple radio transmissions. However, it is noted that in alternative implementations the second radio transmission could also be generated to be decodable by the one or more other radio devices as some other kind of legacy message supported by the other radio devices, such as a data frame addressed to the transmitting radio device, e.g., a second or subsequent MPDU of a burst or fragment, a response to a poll from a PCF, or a frame sent during a contention free period of a PCF.

The second radio transmission may convey the indication to the second radio device on frequency resources which are different from frequency resources assigned to the ACK message, CTS message, or other legacy message. Like for example explained for the edge-subcarriers 320 of the variant illustrated by FIG. 3, the frequency resources conveying the indication to the second radio device may adjacent to the frequency resources assigned to the ACK message, CTS message, or other legacy message.

In some scenarios, the second radio transmission may convey the indication to the second radio device on a subset of frequency resources assigned to the ACK message, CTS message, or other legacy message, like for example explained for the overlay bandwidth 420 of the variant illustrated by FIG. 4.

In some scenarios, the subset of frequency resources may include frequency resources not needed for transmission of the ACK message, CTS message, or other legacy message, e.g., frequency resources to which conventionally padding would be applied.

In some scenarios, the second radio transmission may be based on a modulation scheme defining a two-dimensional constellation diagram having a subset of constellation points forming a one-dimensional constellation diagram, e.g., corresponding to BPSK modulation. In this case the constellation points of the subset may convey the ACK message, CTS message, or other legacy message, while one or more other constellation points of the two-dimensional constellation diagram conveys the indication to the second radio device. A corresponding example based on $\pi/4$-QPSK and BPSK is illustrated in FIG. 5A, and a corresponding example based on QPSK or 4-QAM and BPSK is illustrated in FIG. 5B. Accordingly, the one-dimensional constellation diagram may be configured for demodulation by BPSK and the two-dimensional constellation diagram may be based on QPSK or QAM.

In some scenarios, the second radio transmission may be based on a multi-layer modulation scheme, with a base layer of the multi-layer modulation conveying the ACK message, CTS message, or other legacy message, and one or more higher layers of the multi-layer modulation scheme conveying the indication to the second radio device. Corresponding examples are explained in connection with the hierarchical modulation schemes of FIGS. 6A and 6B.

The indication to the second radio device may include a NACK message to the second radio device. However, other types of indication could be used as well. For example, the second radio transmission could include control information indicating a suggested modulation and/or coding scheme for a further radio transmission from the second radio device and/or a radio channel quality between the first radio device and the second radio device, and the presence of this control information could at the same time provide the indication that the first radio transmission was unsuccessful. Accordingly, the second radio device may be configured to interpret the control information as the indication that reception of the first radio transmission by the second radio device was unsuccessful. In some scenarios, the second radio transmission may also include a NACK message to the second radio device and additional information indicating a suggested modulation and/or coding scheme for a further radio transmission from the second radio device and/or a radio channel quality between the first radio device and the second radio device.

Figure 8:
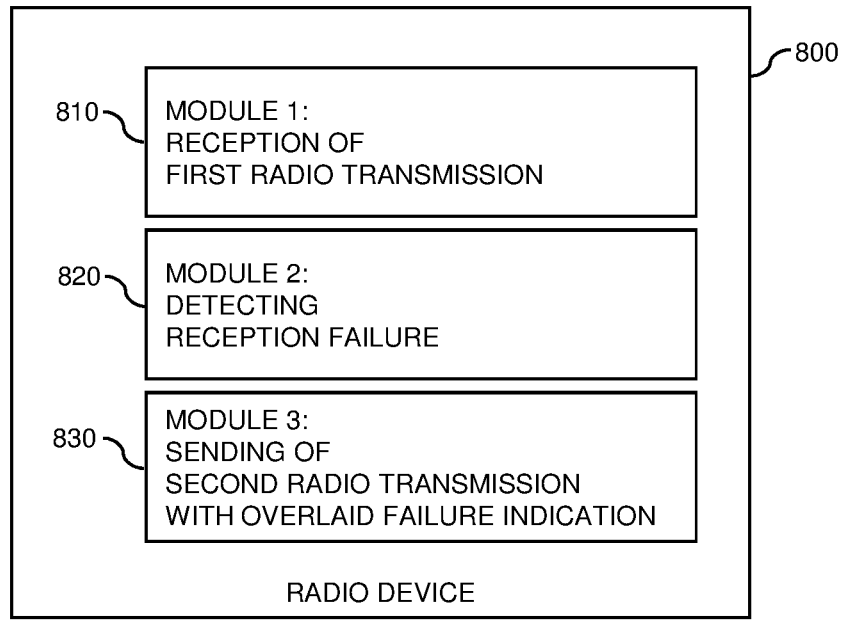
FIG. 8 shows a block diagram for illustrating functionalities of a receiving radio device according to an embodiment of the invention.

FIG. 8 shows a block diagram for illustrating functionalities of a radio device 800 which operates according to the method of FIG. 7. The radio device 800 may for example correspond to the above-mentioned receiving station 20. As illustrated, the radio device 800 may be provided with a module 810 configured to receive a first radio transmission, such as explained in connection with step 710. Further, the radio device 800 may be provided with a module 820 configured to detect a reception failure, such as explained in connection with step 720. Further, the radio device 800 may be provided with a module 830 configured to send a second radio transmission with an overlaid failure indication, such as explained in connection with step 730.

It is noted that the radio device 800 may include further modules for implementing other functionalities, such as known functionalities of a WLAN client or access point. Further, it is noted that the modules of the radio device 800 do not necessarily represent a hardware structure of the radio device 800, but may also correspond to functional elements, e.g., implemented by hardware, software, or a combination thereof.

Figure 9:
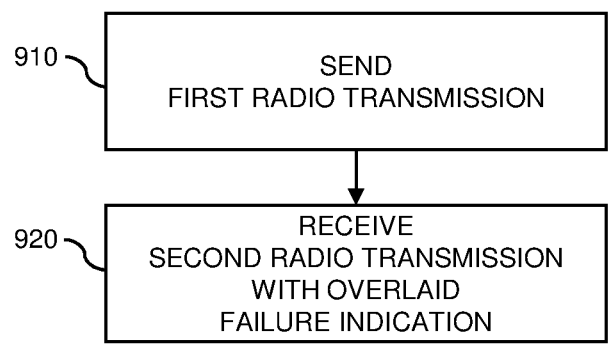
FIG. 9 shows a flowchart for schematically illustrating a transmitter based method of controlling radio transmissions according to an embodiment of the invention.

FIG. 9 shows a flowchart for illustrating a method of controlling radio transmissions, which may be utilized for implementing the illustrated concepts. The method of FIG. 9 may be used for implementing the illustrated concepts in a first radio device which transmits a radio transmission to a second radio device. For example, the first radio device could correspond to the above-mentioned transmitting station 10, and the second radio device could correspond to the above-mentioned receiving station 20. The radio transmissions may be based on a WLAN technology or on a contention-based mode of a cellular radio access technology.

If a processor-based implementation of the first radio device is used, at least some of the steps of the method of FIG. 9 may be performed and/or controlled by one or more processors of the first radio device. Such radio device may also include a memory storing program code for implementing at least some of the below described functionalities or steps of the method of FIG. 9.

At step 910, the first radio device sends a first radio transmission to the second radio device. The first radio transmission may for example be a data frame of a WLAN technology, such as explained for the above-mentioned data frame 101.

At step 920, the first radio device receives a second radio transmission with an overlaid failure indication. That to say, the first radio device receives a second radio transmission from the second radio device, and the second radio transmission includes an indication to the first radio device that reception of the first radio transmission by the second radio device was unsuccessful. The second radio transmission is decodable by one or more other radio devices than the first radio device as including a positive acknowledgement (ACK) message indicating to the first radio device that reception of the first radio transmission by the second radio device was successful or as comprising a CTS message to the first radio device, i.e., a message sent in response to an RTS message from the second radio device and indicating that the second radio device is prepared to receive a radio transmission from the first radio device. The ACK message may be an ACK frame acknowledging a single radio transmission or a block ACK frame transmitted upon request to acknowledge multiple radio transmissions. However, it is noted that in alternative implementations the second radio transmission could also be generated to be decodable by the one or more other radio devices as some other kind of legacy message supported by the other radio devices, such as a data frame addressed to the transmitting radio device, e.g., a second or subsequent MPDU of a burst or fragment, a response to a poll from a PCF, or a frame sent during a contention free period of a PCF.

The second radio transmission may convey the indication to the first radio device on frequency resources which are different from frequency resources assigned to the ACK message, CTS message, or other legacy message. Like for example explained for the edge-subcarriers 320 of the variant illustrated by FIG. 3, the frequency resources conveying the indication to the first radio device may adjacent to the frequency resources assigned to the ACK message, CTS message, or other legacy message.

In some scenarios, the second radio transmission may convey the indication to the first radio device on a subset of frequency resources assigned to the ACK message, CTS message, or other legacy message, like for example explained for the overlay bandwidth 420 of the variant illustrated by FIG. 4.

In some scenarios, the subset of frequency resources may include frequency resources not needed for transmission of the ACK message, CTS message, or other legacy message, e.g., frequency resources to which conventionally padding would be applied.

In some scenarios, the second radio transmission may be based on a modulation scheme defining a two-dimensional constellation diagram having a subset of constellation points forming a one-dimensional constellation diagram, e.g., corresponding to BPSK modulation. In this case the constellation points of the subset may convey the ACK message, CTS message, or other legacy message, while one or more other constellation points of the two-dimensional constellation diagram conveys the indication to the first radio device. A corresponding example based on $\pi/4$-QPSK and BPSK is illustrated in FIG. 5A, and a corresponding example based on QPSK or 4-QAM and BPSK is illustrated in FIG. 5B. Accordingly, the one-dimensional constellation diagram may be configured for demodulation by BPSK and the two-dimensional constellation diagram may be based on QPSK or QAM.

In some scenarios, the second radio transmission may be based on a multi-layer modulation scheme, with a base layer of the multi-layer modulation conveying the ACK message, CTS message, or other legacy message, and one or more higher layers of the multi-layer modulation scheme conveying the indication to the first radio device. Corresponding examples are explained in connection with the hierarchical modulation schemes of FIGS. 6A and 6B.

The indication to the first radio device may include a NACK message to the first radio device. However, other types of indication could be used as well. For example, the second radio transmission could include control information indicating a suggested modulation and/or coding scheme for a further radio transmission from the first radio device and/or a radio channel quality between the first radio device and the second radio device, and the presence of this control information could at the same time provide the indication that the first radio transmission was unsuccessful. Accordingly, the first radio device may interpret the control information as the indication that reception of the first radio transmission by the second radio device was unsuccessful. In some scenarios, the second radio transmission may also include a NACK message to the first radio device and additional information indicating a suggested modulation and/or coding scheme for a further radio transmission from the first radio device and/or a radio channel quality between the first radio device and the second radio device.

Figure 10:
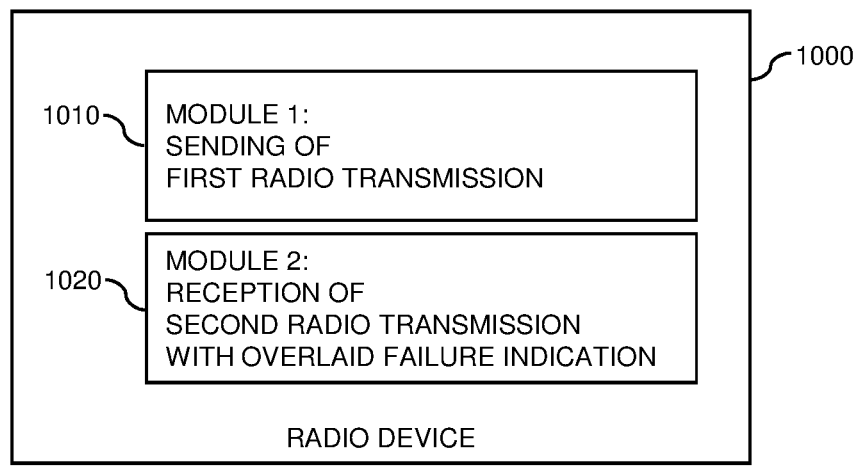
FIG. 10 shows a block diagram for illustrating functionalities of a transmitting radio device according to an embodiment of the invention.

FIG. 10 shows a block diagram for illustrating functionalities of a radio device 1000 which operates according to the method of FIG. 9. The radio device 1000 may for example correspond to the above-mentioned transmitting station 10. As illustrated, the radio device 1000 may be provided with a module 1010 configured to send a first radio transmission, such as explained in connection with step 910. Further, the radio device 1000 may be provided with a module 1020 configured to receive a second radio transmission with an overlaid failure indication, such as explained in connection with step 920.

It is noted that the radio device 1000 may include further modules for implementing other functionalities, such as known functionalities of a WLAN client or access point. Further, it is noted that the modules of the radio device 1000 do not necessarily represent a hardware structure of the radio device 1000, but may also correspond to functional elements, e.g., implemented by hardware, software, or a combination thereof.

Figure 11:
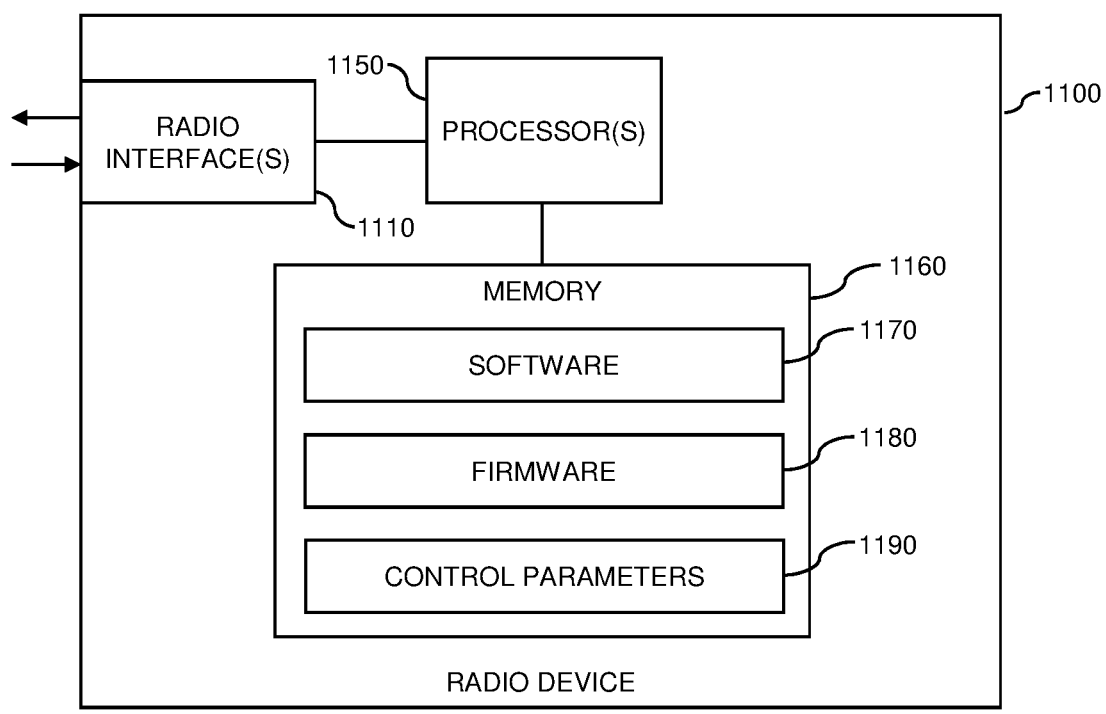
FIG. 11 schematically illustrates structures of a radio device according to an embodiment of the invention.

FIG. 11 illustrates a processor-based implementation of a radio device 1100 which may be used for implementing the above described concepts. For example, the structures as illustrated in FIG. 11 may be used for implementing the concepts in the above-mentioned transmitting station 10 or receiving station 20.

As illustrated, the radio device 1100 includes one or more radio interfaces 1110. The radio interface(s) may for example support a WLAN technology or a contention-based mode of a cellular network technology.

Further, the radio device 1100 may include one or more processors 1150 coupled to the radio interface(s) 1110 and a memory 1160 coupled to the processor(s) 1150. By way of example, the radio interface(s) 1110, the processor(s) 1150, and the memory 1160 could be coupled by one or more internal bus systems of the radio device 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170, firmware 1180, and/or control parameters 1190. The memory 1160 may include suitably configured program code to be executed by the processor(s) 1150 so as to implement the above-described functionalities of a radio device or apparatus for controlling radio devices, such as explained in connection with FIGS. 7 and/or 9.

It is to be understood that the structures as illustrated in FIG. 11 are merely schematic and that the radio device 1100 may actually include further components which, for the sake of clarity, have not been illustrated, e.g., further interfaces or processors. Also, it is to be understood that the memory 1160 may include further program code for implementing known functionalities of an a WLAN client, WLAN access point, or similar radio device. According to some embodiments, also a computer program may be provided for implementing functionalities of the radio device 1100, e.g., in the form of a physical medium storing the program code and/or other data to be stored in the memory 1160 or by making the program code available for download or by streaming.

It is noted that the functionalities as explained in connection with FIGS. 7 and 9 could also be combined in a system which includes a first radio device operating according to the method of FIG. 9, a second radio device operating according to the method of FIG. 7, and one or more other radio devices. In such system, the first radio device may send a first radio transmission to the second radio device. The second radio device receives the first radio transmission. In response to reception of the first radio transmission by the second radio device being unsuccessful, the second radio device sends a second radio transmission to the first radio device, the second radio transmission includes an indication to the first radio device that reception of the first radio transmission by the second radio device was unsuccessful. The second radio device generates the second radio transmission to be decodable by the one or more other radio devices as comprising an ACK message indicating to the first radio device that reception of the first radio transmission by the second radio device was successful, or as including a CTS message to the first radio device, or as including some other type of legacy message supported by the other radio devices.

As can be seen, the concepts as described above may be used for efficiently enhancing a feedback mechanism for radio transmissions by providing an explicit failure indication from a receiving radio device to a transmitting radio device, using a legacy message with overlaid additional information as a vehicle for the failure indication. In this way, some radio devices may benefit from the enhanced feedback mechanism while adverse effects on legacy radio devices, which do not support the enhanced feedback mechanism, can be avoided. Further, the explicit failure indication enables a fast reaction when quickly changing channel conditions result in failed reception of one or more radio transmissions. This is specifically beneficial in radio technologies using large transmission bandwidths of 20 MHz or more, like the above-mentioned examples.

It is to be understood that the examples and embodiments as explained above are merely illustrative and susceptible to various modifications. For example, the illustrated concepts may be applied in connection with various kinds of radio technologies, without limitation to the above-mentioned examples of a WLAN technology or cellular radio technology. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided by the present disclosure include:

Embodiment 1

A method of controlling radio transmissions in a wireless communication network, the method comprising:
a first radio device (20; 800; 1100) receiving a first radio transmission (101) from a second radio device (10; 1000; 1100);
in response to reception of the first radio transmission (101) by the first radio device (20; 800; 1100) being unsuccessful, the first radio device (20; 800; 1100) sending a second radio transmission (103) to the second radio device, the second radio transmission (103) comprising an indication to the second radio device (10; 1000; 1100) that reception of the first radio transmission (101) by the first radio device (20; 800; 1100) was unsuccessful; and
the first radio device (20; 800; 1100) generating the second radio transmission (103) to be decodable by one or more other radio devices (30) than the second radio device (10; 1000; 1100) as comprising a positive acknowledgement message indicating to the second radio device (10; 1000; 1100) that reception of the first radio transmission (101) by the first radio device (20; 800; 1100) was successful or as comprising a clear-to-send message to the second radio device (10; 1000; 1100).

Embodiment 2

The method according to embodiment 1,
wherein the second radio transmission (103) conveys the indication to the second radio device (10; 1000; 1100) on frequency resources (320) which are different from frequency resources (310) assigned to the positive acknowledgement message or clear-to-send message.

Embodiment 3

The method according to embodiment 2,
wherein the frequency resources (320) conveying the indication to the second radio device (10; 1000; 1100) are adjacent to the frequency resources (310) assigned to the positive acknowledgement message or clear-to-send message.

Embodiment 4

The method according to any one of embodiments 1 to 3,
wherein the second radio transmission (103) conveys the indication to the second radio device (10; 1000; 1100) on a subset (420) of frequency resources (410) assigned to the positive acknowledgement message or clear-to-send message.

Embodiment 5

The method according to embodiment 4,
wherein the subset (410) of frequency resources comprises frequency resources not needed for transmission of the positive acknowledgement message or clear-to-send message.

Embodiment 6

The method according to any one of embodiments 1 to 5,
wherein the second radio transmission (103) is based on a modulation scheme defining a two-dimensional constellation diagram having a subset of constellation points (510; 530) forming a one-dimensional constellation diagram, and wherein the constellation points (510; 530) of the subset convey the positive acknowledgement message or clear-to-send message, and
wherein one or more other constellation points (520; 540) of the two-dimensional constellation diagram conveys the indication to the second radio device (10; 1000; 1100).

Embodiment 7

The method according to embodiment 6,
wherein the one-dimensional constellation diagram is configured for demodulation by binary phase shift keying.

Embodiment 8

The method according to embodiment 6 or 7,
wherein the two-dimensional constellation diagram is based on quadrature phase shift keying or quadrature amplitude modulation.

Embodiment 9

The method according to any one of embodiments 1 to 8,
wherein the second radio transmission (103) is based on a multi-layer modulation scheme, with a base layer (610, 630) of the multi-layer modulation conveying the positive acknowledgement message or clear-to-send message, and one or more higher layers (620; 640) of the multi-layer modulation scheme conveying the indication to the second radio device (10; 1000; 1100).

Embodiment 10

The method according to any one of embodiments 1 to 9,
wherein the indication to the second radio device (10; 1000; 1100) comprises a negative acknowledgement message to the second radio device (10; 1000; 1100).

Embodiment 11

The method according to any one of embodiments 1 to 10,
wherein the second radio transmission (103) comprises control information indicating a suggested modulation and/or coding scheme for a further radio transmission from the second radio device (10; 1000; 1100) to the first radio device (20; 800; 1100).

Embodiment 12

The method according to any one of embodiments 1 to 11,
wherein the second radio transmission (103) further comprises control information indicating a radio channel quality between the first radio device (20; 800; 1100) and the second radio device (10; 1000; 1100).

Embodiment 13

The method according to embodiment 11 or 12,
wherein the second radio device (10; 1000; 1100) is configured to interpret the control information as the indication that reception of the first radio transmission (101) by the first radio device (20; 800; 1100) was unsuccessful.

Embodiment 14

The method according to any one of embodiments 1 to 13, wherein the radio transmissions are based on a Wireless Local Area Network technology.

Embodiment 15

The method according to any one of embodiments 1 to 13, wherein the radio transmissions are based on a contention-based mode of a cellular radio access technology.

Embodiment 16

A method of controlling radio transmissions in a wireless communication network, the method comprising:
a first radio device (10; 1000; 1100) sending a first radio transmission (101) to a second radio device (20; 800; 1100);
the first radio device (10; 1000; 1100) receiving a second radio transmission (103) from the second radio device (20; 800; 1100), the second radio transmission (103) comprising an indication to the first radio device (10; 1000; 1100) that reception of the first radio transmission (101) by the second radio device (20; 800; 1100) was unsuccessful,
wherein the second radio transmission (103) is decodable by one or more other radio devices (30) than the first radio device (10; 1000; 1100) as comprising a positive acknowledgement message indicating to the first radio device (10; 1000; 1100) that reception of the first radio transmission by the second radio device (20; 800; 1100) was successful or as comprising a clear-to-send message to the first radio device (10; 1000; 1100).

Embodiment 17

The method according to embodiment 16, wherein the second radio transmission (103) conveys the indication to the first radio device (10; 1000; 1100) on frequency resources (320) which are different from frequency resources (310) assigned to the positive acknowledgement message or clear-to-send message.

Embodiment 18

The method according to embodiment 17, wherein the frequency resources (320) conveying the indication to the first radio device (10; 1000; 1100) are adjacent to the frequency resources (310) assigned to the positive acknowledgement message or clear-to-send message.

Embodiment 19

The method according to any one of embodiments 16 to 18, wherein the second radio transmission (103) conveys the indication to the first radio device (10; 1000; 1100) on a subset (420) of frequency resources (410) assigned to the positive acknowledgement message or clear-to-send message.

Embodiment 20

The method according to embodiment 19, wherein the subset (420) of frequency resources comprises frequency resources not needed for transmission of the positive acknowledgement message or clear-to-send message.

Embodiment 21

The method according to any one of embodiments 16 to 20, wherein the second radio transmission (103) is based on a modulation scheme defining a two-dimensional constellation diagram having a subset of constellation points (510; 530) forming a one-dimensional constellation diagram, and wherein the constellation points (510; 530) of the subset convey the positive acknowledgement message or clear-to-send message, and
wherein one or more other constellation points (520; 540) of the two-dimensional constellation diagram convey the indication to the first radio device (10; 1000; 1100).

Embodiment 22

The method according to embodiment 21, wherein the one-dimensional constellation diagram is configured for demodulation by binary phase shift keying.

Embodiment 23

The method according to embodiment 21 or 22, wherein the two-dimensional constellation diagram is based on quadrature phase shift keying or quadrature amplitude modulation.

Embodiment 24

The method according to any one of embodiments 16 to 23, wherein the second radio transmission (103) is based on a multi-layer modulation scheme, with a base layer (610, 630) of the multi-layer modulation conveying the positive acknowledgement message or clear-to-send message, and one or more higher layers (620; 640) of the multi-layer modulation scheme conveying the indication to the first radio device (10; 1000; 1100).

Embodiment 25

The method according to any one of embodiments 16 to 24, wherein the indication to the first radio device (10; 1000; 1100) comprises a negative acknowledgement message to the first radio device (10; 1000; 1100).

Embodiment 26

The method according to any one of embodiments 16 to 25, wherein the second radio transmission (103) comprises control information indicating a suggested modulation and/or coding scheme for a further radio transmission from the first radio device (10; 1000; 1100) to the second radio device (20; 800; 1100).

Embodiment 27

The method according to any one of embodiments 16 to 26, wherein the second radio transmission comprises control information indicating a radio channel quality between the first radio device (10; 1000; 1100) and the second radio device (20; 800; 1100).

Embodiment 28

The method according to embodiment 26 or 27, comprising:
the first radio device (10; 1000; 1100) interpreting the control information as the indication that reception of the first radio transmission (101) by the second radio device (20; 800; 1100) was unsuccessful.

Embodiment 29

The method according to any one of embodiments 16 to 28,
wherein the radio transmissions are based on a Wireless Local Area Network technology.

Embodiment 30

The method according to any one of embodiments 16 to 28,
wherein the radio transmissions are based on a contention-based mode of a cellular radio access technology.

Embodiment 31

A radio device (20; 800; 1100) for a wireless communication network, the radio device (20; 800; 1100) being configured to:
receive a first radio transmission (101) from a further radio device (10; 1000; 1100);
in response to reception of the first radio transmission (101) by the radio device (20; 800; 1100) being unsuccessful, send a second radio transmission (103) to the further radio device (10; 1000; 1100), the second radio transmission (103) comprising an indication to the further radio device (10; 1000; 1100) that reception of the first radio transmission (101) by the radio device (20; 800; 1100) was unsuccessful; and
generate the second radio transmission (103) to be decodable by one or more other radio devices (30) than the further radio device (10; 1000; 1100) as comprising a positive acknowledgement message indicating to the further radio device (10; 1000; 1100) that reception of the first radio transmission (101) by the radio device (20; 800; 1100) was successful or as comprising a clear-to-send message to the further radio device (10; 1000; 1100).

Embodiment 32

The radio device (20; 800; 1100) according to embodiment 31,
wherein the second radio transmission (103) conveys the indication to the further radio device (10; 1000; 1100) on frequency resources (320) which are different from frequency resources (310) assigned to the positive acknowledgement message or clear-to-send message.

Embodiment 33

The radio device (20; 800; 1100) according to embodiment 32,
wherein the frequency resources (320) conveying the indication to the further radio device (10; 1000; 1100) are adjacent to the frequency resources (310) assigned to the positive acknowledgement message or clear-to-send message.

Embodiment 34

The radio device (20; 800; 1100) according to any one of embodiments 31 to 33,
wherein the second radio transmission (103) conveys the indication to the further radio device (10; 1000; 1100) on a subset (420) of frequency resources (410) assigned to the positive acknowledgement message or clear-to-send message.

Embodiment 35

The radio device (20; 800; 1100) according to embodiment 34,
wherein the subset (410) of frequency resources comprises frequency resources not needed for transmission of the positive acknowledgement message or clear-to-send message.

Embodiment 36

The radio device (20; 800; 1100) according to any one of embodiments 31 to 35,
wherein the second radio transmission (103) is based on a modulation scheme defining a two-dimensional constellation diagram having a subset of constellation points (510; 530) forming a one-dimensional constellation diagram, and wherein the constellation points (510; 530) of the subset convey the positive acknowledgement message or clear-to-send message, and
wherein one or more other constellation points (520; 540) of the two-dimensional constellation diagram conveys the indication to the further radio device (10; 1000; 1100).

Embodiment 37

The radio device (20; 800; 1100) according to embodiment 36,
wherein the one-dimensional constellation diagram is configured for demodulation by binary phase shift keying.

Embodiment 38

The radio device (20; 800; 1100) according to embodiment 36 or 37,
wherein the two-dimensional constellation diagram is based on quadrature phase shift keying or quadrature amplitude modulation.

Embodiment 39

The radio device (20; 800; 1100) according to any one of embodiments 31 to 38,
wherein the second radio transmission (103) is based on a multi-layer modulation scheme, with a base layer (610, 630) of the multi-layer modulation conveying the positive acknowledgement message or clear-to-send message, and one or more higher layers (620; 640) of the multi-layer modulation scheme conveying the indication to the further radio device (10; 1000; 1100).

Embodiment 40

The radio device (20; 800; 1100) according to any one of embodiments 31 to 39,
wherein the indication to the further radio device (10; 1000; 1100) comprises a negative acknowledgement message to the further radio device (10; 1000; 1100).

Embodiment 41

The radio device (20; 800; 1100) according to any one of embodiments 31 to 40,
wherein the second radio transmission (103) comprises control information indicating a suggested modulation and/or coding scheme for a further radio transmission from the further radio device (10; 1000; 1100) to the radio device (20; 800; 1100).

Embodiment 42

The radio device (20; 800; 1100) according to any one of embodiments 31 to 41,
wherein the second radio transmission (103) further comprises control information indicating a radio channel quality between the radio device (20; 800; 1100) and the further radio device (10; 1000; 1100).

Embodiment 43

The radio device (20; 800; 1100) according to embodiment 31 or 42,
wherein the further radio device (10; 1000; 1100) is configured to interpret the control information as the indication that reception of the first radio transmission (101) by the first radio device (20; 800; 1100) was unsuccessful.

Embodiment 44

The radio device (20; 800; 1100) according to any one of embodiments 31 to 43,
wherein the radio transmissions are based on a Wireless Local Area Network technology.

Embodiment 45

The radio device (20; 800; 1100) according to any one of embodiments 31 to 44,
wherein the radio transmissions are based on a contention-based mode of a cellular radio access technology.

Embodiment 46

The radio device (20; 800; 1100) according to any of embodiments 31 to 45,
wherein the radio device (20; 800; 1100) is configured to operate as the first radio device (20; 800; 1100) of a method according to any one of embodiments 1 to 15.

Embodiment 47

The radio device (20; 800; 1100) according to any one of embodiments 31 to 46, comprising:
at least one processor and a memory containing instructions executable by said at least one processor, whereby the radio device (20; 800; 1100) is operative as the first radio device (20; 800; 1100) of a method according to any one of embodiments 1 to 15.

Embodiment 48

A radio device (10; 1000; 1100) for a wireless communication network, the radio device (10; 1000; 1100) being configured to:
send a first radio transmission (101) to a further radio device (20; 800; 1100);
receive a second radio transmission (103) from the further radio device (20; 800; 1100), the second radio transmission (103) comprising an indication to the radio device (10; 1000; 1100) that reception of the first radio transmission (101) by the further radio device (20; 800; 1100) was unsuccessful,
wherein the second radio transmission (103) is decodable by one or more other radio devices (30) than the radio device (10; 1000; 1100) as comprising a positive acknowledgement message indicating to the radio device (10; 1000; 1100) that reception of the first radio transmission (101) by the further radio device (20; 800; 1100) was successful or as comprising a clear-to-send message to the radio device (10; 1000; 1100).

Embodiment 49

The radio device (10; 1000; 1100) according to embodiment 48,
wherein the second radio transmission (103) conveys the indication to the radio device (10; 1000; 1100) on frequency resources (320) which are different from frequency resources (310) assigned to the positive acknowledgement message or clear-to-send message.

Embodiment 50

The radio device (10; 1000; 1100) according to embodiment 49,
wherein the frequency resources (320) conveying the indication to the radio device (10; 1000; 1100) are adjacent to the frequency resources (310) assigned to the positive acknowledgement message or clear-to-send message.

Embodiment 51

The radio device (10; 1000; 1100) according to any one of embodiments 48 to 50,
wherein the second radio transmission (103) conveys the indication to the radio device (10; 1000; 1100) on a subset (420) of frequency resources (410) assigned to the positive acknowledgement message or clear-to-send message.

Embodiment 52

The radio device (10; 1000; 1100) according to embodiment 51,
wherein the subset (420) of frequency resources comprises frequency resources not needed for transmission of the positive acknowledgement message or clear-to-send message.

Embodiment 53

The radio device (10; 1000; 1100) according to any one of embodiments 48 to 52,
wherein the second radio transmission (103) is based on a modulation scheme defining a two-dimensional constellation diagram having a subset of constellation points (510; 530) forming a one-dimensional constellation diagram, and wherein the constellation points (510; 530) of the subset convey the positive acknowledgement message or clear-to-send message, and
wherein one or more other constellation points (520; 540) of the two-dimensional constellation diagram convey the indication to the radio device (10; 1000; 1100).

Embodiment 54

The radio device (10; 1000; 1100) according to embodiment 53,
wherein the one-dimensional constellation diagram is configured for demodulation by binary phase shift keying.

Embodiment 55

The radio device (10; 1000; 1100) according to embodiment 53 or 54,
wherein the two-dimensional constellation diagram is based on quadrature phase shift keying or quadrature amplitude modulation.

Embodiment 56

The radio device (10; 1000; 1100) according to any one of embodiments 48 to 55,
wherein the second radio transmission (103) is based on a multi-layer modulation scheme, with a base layer (610, 630) of the multi-layer modulation conveying the positive acknowledgement message or clear-to-send message, and one or more higher layers (620; 640) of the multi-layer modulation scheme conveying the indication to the radio device (10; 1000; 1100).

Embodiment 57

The radio device (10; 1000; 1100) according to any one of embodiments 48 to 56,
wherein the indication to the radio device (10; 1000; 1100) comprises a negative acknowledgement message to the radio device (10; 1000; 1100).

Embodiment 58

The radio device (10; 1000; 1100) according to any one of embodiments 48 to 57,
wherein the second radio transmission (103) comprises control information indicating a suggested modulation and/or coding scheme for a further radio transmission from the radio device (10; 1000; 1100) to the further radio device (20; 800; 1100).

Embodiment 59

The radio device (10; 1000; 1100) according to any one of embodiments 48 to 58,
wherein the second radio transmission comprises control information indicating a radio channel quality between the radio device (10; 1000; 1100) and the further radio device (20; 800; 1100).

Embodiment 60

The radio device (10; 1000; 1100) according to embodiment 58 or 59,
wherein the radio device (10; 1000; 1100) is configured to interpret the control information as the indication that reception of the first radio transmission (101) by the further radio device (20; 800; 1100) was unsuccessful.

Embodiment 61

The radio device (10; 1000; 1100) according to any one of embodiments 48 to 60,
wherein the radio transmissions are based on a Wireless Local Area Network technology.

Embodiment 62

The radio device (10; 1000; 1100) according to any one of embodiments 48 to 60,
wherein the radio transmissions are based on a contention-based mode of a cellular radio access technology.

Embodiment 63

The radio device (10; 1000; 1100) according to any of embodiments 48 to 62,
wherein the radio device (10; 1000; 1100) is configured to operate as the first radio device (10; 1000; 1100) of a method according to any one of embodiments 16 to 30.

Embodiment 64

The radio device (10; 1000; 1100) according to any one of embodiments 48 to 63, comprising:
at least one processor and a memory containing instructions executable by said at least one processor, whereby the radio device (10; 1000; 1100) is operative as the first radio device (10; 1000; 1100) of a method according to any one of embodiments 16 to 30.

Embodiment 65

A system, comprising:
a first radio device (10; 1000; 1100), a second radio device (20; 800; 1100), and one or more other radio devices (30);
the first radio device (10; 1000; 1100) being configured to send a first radio transmission (101) to the second radio device (20; 800; 1100);
the second radio device (20; 800; 1100) being configured to:
receive the first radio transmission (101);
in response to reception of the first radio transmission (101) by the second radio device (20; 800; 1100) being unsuccessful, send a second radio transmission (103) to the first radio device (10; 1000; 1100), the second radio transmission (103) comprising an indication to the first radio device (10; 1000; 1100) that reception of the first radio transmission (101) by the second radio device (20; 800; 1100) was unsuccessful; and
generate the second radio transmission (103) to be decodable by the one or more other radio devices (30) as comprising a positive acknowledgement message indicating to the first radio device (10; 1000; 1100) that reception of the first radio transmission (101) by the second radio device (20; 800; 1100) was successful or as comprising a clear-to-send message to the first radio device (10; 1000; 1100).

Embodiment 66

A computer program comprising program code to be executed by at least one processor of a radio device (20; 800; 1100), whereby execution of the program code causes the radio device (20; 800; 1100) to operate as the first radio device (20; 800; 1100) of a method according to any one of embodiments 1 to 15.

Embodiment 67

A computer program product comprising program code to be executed by at least one processor of a radio device (20; 800; 1100), whereby execution of the program code causes the radio device (20; 800; 1100) to operate as the first radio device (20; 800; 1100) of a method according to any one of embodiments 1 to 15.

Embodiment 68

A computer program comprising program code to be executed by at least one processor of a radio device (10; 1000; 1100), whereby execution of the program code causes the radio device (10; 1000; 1100) to operate as the first radio device (10; 1000; 1100) of a method according to any one of embodiments 16 to 30.

Embodiment 69

A computer program product comprising program code to be executed by at least one processor of a radio device (10; 1000; 1100), whereby execution of the program code causes the radio device (10; 1000; 1100) to operate as the first radio device (10; 1000; 1100) of a method according to any one of embodiments 16 to 30.

The invention claimed is:

1. A method of controlling radio transmissions in a wireless communication network, the method comprising:
   a first radio device receiving a first radio transmission from a second radio device; and
   in response to reception of the first radio transmission by the first radio device being unsuccessful, the first radio device sending a second radio transmission to the second radio device, the second radio transmission comprising a receiver address that indicates that the second radio transmission is addressed to the second radio device and a negative acknowledgement message that indicates that reception of the first radio transmission by the first radio device was unsuccessful;
   wherein the first radio device generates the second radio transmission comprising the negative acknowledgement message to be decodable by one or more other radio devices that receive the second radio transmission as a positive acknowledgement message that indicates to the second radio device that reception of the first radio transmission by the first radio device was successful or as a clear-to-send message to the second radio device.

2. The method according to claim 1,
   wherein the second radio transmission conveys the negative acknowledgement message to the second radio device on at least one of: 1) frequency resources which are different from frequency resources assigned to the positive acknowledgement message or clear-to-send message; and 2) a subset of frequency resources assigned to the positive acknowledgement message or clear-to-send message.

3. The method according to claim 1,
   wherein the second radio transmission is based on a modulation scheme defining a two-dimensional constellation diagram having a subset of constellation points forming a one-dimensional constellation diagram,
   wherein the constellation points of the subset convey the positive acknowledgement message or clear-to-send message, and
   wherein one or more other constellation points of the two-dimensional constellation diagram conveys the negative acknowledgement message to the second radio device.

4. The method according to claim 1,
   wherein the second radio transmission is based on a multi-layer modulation scheme, with a base layer of the multi-layer modulation conveying the positive acknowledgement (ACK) message or clear-to-send message, and one or more higher layers of the multi-layer modulation scheme conveying the negative acknowledgement message to the second radio device.

5. The method according to claim 1,
   wherein the second radio transmission comprises at least one of: 1) control information indicating a suggested modulation and/or coding scheme for a further radio transmission from the second radio device to the first radio device; and 2) control information indicating a radio channel quality between the first radio device and the second radio device.

6. A computer program product comprising a non-transitory computer readable medium storing program code to be executed by at least one processor of a radio device, whereby execution of the program code by the at least one processor causes the radio device to operate as the first radio device of the method according to claim 1.

7. A method of controlling radio transmissions in a wireless communication network, the method comprising:
   a first radio device sending a first radio transmission to a second radio device; and
   the first radio device receiving a second radio transmission from the second radio device, the second radio transmission comprising a receiver address that indicates that the second radio transmission is addressed to the first radio device and a negative acknowledgement message that indicates that reception of the first radio transmission by the second radio device was unsuccessful,
   wherein the second radio transmission comprising the negative acknowledgement message is decodable by one or more other radio devices that receive the second radio transmission as comprising a positive acknowledgement message that indicates to the first radio device that reception of the first radio transmission by the second radio device was successful or as a clear-to-send message to the first radio device.

8. The method according to claim 7,
   wherein the second radio transmission conveys the negative acknowledgement message to the first radio device on at least one of: 1) frequency resources which are different from frequency resources assigned to the positive acknowledgement message or clear-to-send message; and 2) a subset of frequency resources assigned to the positive acknowledgement message or clear-to-send message.

9. The method according to claim 7,
   wherein the second radio transmission is based on a modulation scheme defining a two-dimensional constellation diagram having a subset of constellation points forming a one-dimensional constellation diagram,
   wherein the constellation points of the subset convey the positive acknowledgement message or clear-to-send message, and wherein one or more other constellation points of the two-dimensional constellation diagram convey the negative acknowledgement message to the first radio device.

10. The method according to claim 7,
wherein the second radio transmission is based on a multi-layer modulation scheme, with a base layer of the multi-layer modulation conveying the positive acknowledgement message or clear-to-send message, and one or more higher layers of the multi-layer modulation scheme conveying the negative acknowledgement message to the first radio device.

11. The method according to claim 7,
wherein the second radio transmission comprises control information indicating at least one of: 1) a suggested modulation and/or coding scheme for a further radio transmission from the first radio device to the second radio device; and 2) a radio channel quality between the first radio device and the second radio device.

12. A computer program product comprising a non-transitory computer readable medium storing program code to be executed by at least one processor of a radio device, whereby execution of the program code by the at least one processor causes the radio device to operate as the first radio device of a method according to claim 7.

13. A radio device for a wireless communication network, the radio device comprising:
at least one processor; and
at least one memory storing program that is executed by the at least one processor to perform operations to:
receive a first radio transmission from a further radio device;
in response to reception of the first radio transmission by the radio device being unsuccessful, send a second radio transmission to the second radio device, the second radio transmission comprising a receiver address that indicates that the second radio transmission is addressed to the second radio device and a negative acknowledgement message that indicates that reception of the first radio transmission by the first radio device was unsuccessful; and
generate the second radio transmission to be decodable by one or more other radio devices than the further radio device as comprising a positive acknowledgement message indicating to the further radio device that reception of the first radio transmission by the radio device was successful or as comprising a clear-to-send message to the further radio device.

14. The radio device according to claim 13,
wherein the second radio transmission conveys the negative acknowledgement message to the second radio device on at least one of: 1) frequency resources which are different from frequency resources assigned to the positive acknowledgement message or clear-to-send message; and 2) a subset of frequency resources assigned to the positive acknowledgement message or clear-to-send message.

15. The radio device according to claim 13,
wherein the second radio transmission is based on a modulation scheme defining a two-dimensional constellation diagram having a subset of constellation points forming a one-dimensional constellation diagram,
wherein the constellation points of the subset convey the positive acknowledgement message or clear-to-send message, and
wherein one or more other constellation points of the two-dimensional constellation diagram conveys the negative acknowledgement message to the second radio device.

16. The radio device according to claim 13,
wherein the second radio transmission is based on a multi-layer modulation scheme, with a base layer of the multi-layer modulation conveying the positive acknowledgement message or clear-to-send message, and one or more higher layers of the multi-layer modulation scheme conveying the negative acknowledgement message to the second radio device.

17. The radio device according to claim 13,
wherein the second radio transmission comprises at least one of: 1) control information indicating a suggested modulation and/or coding scheme for a further radio transmission from the second radio device to the first radio device; and 2) control information indicating a radio channel quality between the first radio device and the second radio device.

18. A radio device for a wireless communication network, the radio device comprising:
at least one processor; and
at least one memory storing program that is executed by the at least one processor to perform operations to:
send a first radio transmission to a further radio device; and
receive a second radio transmission from the second radio device, the second radio transmission comprising a receiver address that indicates that the second radio transmission is addressed to the first radio device and a negative acknowledgement message that indicates that reception of the first radio transmission by the second radio device was unsuccessful,
wherein the second radio transmission comprising the negative acknowledgement message is decodable by one or more other radio devices that receive the second radio transmission as comprising a positive acknowledgement message that indicates to the first radio device that reception of the first radio transmission by the second radio device was successful or as a clear-to-send message to the first radio device.

19. The radio device according to claim 13, wherein the second radio transmission conveys the negative acknowledgement message to the first radio device on at least one of: 1) frequency resources which are different from frequency resources assigned to the positive acknowledgement message or clear-to-send message; and 2) a subset of frequency resources assigned to the positive acknowledgement message or clear-to-send message.

20. The radio device according to claim 18,
wherein the second radio transmission is based on a modulation scheme defining a two-dimensional constellation diagram having a subset of constellation points forming a one-dimensional constellation diagram,
wherein the constellation points of the subset convey the positive acknowledgement message or clear-to-send message, and
wherein one or more other constellation points of the two-dimensional constellation diagram convey the negative acknowledgement message to the first radio device.

21. The radio device according to claim 18,
wherein the second radio transmission is based on a multi-layer modulation scheme, with a base layer of the multi-layer modulation conveying the positive acknowledgement message or clear-to-send message, and one or more higher layers of the multi-layer modulation scheme conveying the negative acknowledgement message to the first radio device.

22. The radio device according to claim 18, wherein the second radio transmission comprises control information indicating at least one of: 1) a suggested modulation and/or coding scheme for a further radio transmission from the first radio device to the second radio device; and 2) a radio channel quality between the first radio device and the second radio device.

\* \* \* \* \*